3,639,344
COATING COMPOSITIONS COMPRISING AN EPOXY RESIN AND ALIPHATIC AMINE REACTION PRODUCTS

William P. Kinnneman, Jr., Suffern, N.Y., and John R. Uram, Jr., Fairfield, N.J., assignors to Sika Chemical Corporation
No Drawing. Filed Aug. 21, 1969, Ser. No. 852,109
Int. Cl. C08g 30/14
U.S. Cl. 260—47 EN                              9 Claims

ABSTRACT OF THE DISCLOSURE

This invention relates to a coating composition suitable for coating or painting wet or damp substrates which is capable of curing to a hard film under water comprising an epoxy resin and a substantially water-insensitive curing agent for said resin comprising a reaction product of a polyamine and a monofunctional epoxide-containing material.

BACKGROUND OF THE INVENTION

Heretofore, it has not been possible to formulate coating systems that are completely suitable for painting or coating wet or damp substrates. Formulations tried have included typical epoxy resins cured with polyamid curing agents. These are not suitable since the polyamid resins are water-soluble and, conversely, water is soluble in the resins.

Other attempts have been made using film-forming materials capable of hardening under water. These require the use of special water-soluble solvent systems and have poor adhesion to underwater or damp surfaces. Attempts to overcome the problem of poor adhesion have included the addition of aliphatic amines and aliphatic diamines to such compositions as set forth in U.S. Patent No. 3,261,880.

SUMMARY OF THE INVENTION

Coating compositions have now been found which do not require special solvents and which readily adhere to wet substrates and can cure under water to form a hard, uniform coating.

Briefly stated, the present invention comprises coating compositions comprising an epoxy resin and a substantially water-insensitive curing agent for said resin comprising a reaction product of a polyamine and a monofunctional epoxy-containing material. In its preferred embodiment, the invention comprises the use of the stated curing agents having a solubility in water of less than about 5 percent.

DETAILED DESCRIPTION

As to materials, the two essential components of the composition are the epoxy resin and the curing agent. In certain instances where a more rapid cure is desired, an accelerator can be included in the composition.

The epoxy resin used can be any of the usual epoxy resins having a plurality of 1,2-epoxy groups commonly used in making coatings, preferably the condensation products of bisphenol A and epichlorohydrin. However, other polyols, such as aliphatic glycols and novolac resins can be used in place of the bisphenol. In addition, the cycloaliphatic epoxy coating resins can be used. A wide range of such resins is commercially available and all are suitable in the compositions of the instant invention. Epoxy resins containing reactive diluents can also be used, or the reactive diluents added to the composition.

The curing agent must be the reaction product of a polyamine and a monofunctional epoxide-containing material. As to polyamines it is preferred to use an aliphatic polyamine such as ethylene diamine (EDA), diethylene triamine (DETA), triethylene tetramine (TETA), pentaethylene hexamine (PEHA), 1,3-propane diamine, imino-bispropylamine, mixtures thereof, and the like polyamines.

The monofunctional epoxide-containing material can be any olefin oxide, aromatic or aliphatic glycidyl, and other glycidyl and oxide compounds having an epoxy group

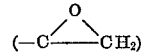

which is reactive with an amine. Specific examples are octylene oxide, butyl glycidyl ether, styrene oxide, phenyl glycidyl ether, p-butyl phenyl glycidyl ether, cresyl glycidyl ether, glycidyl methacrylate, allyl glycidyl ether, cyclohexene vinyl monoxide, dipentene monoxide, a pinene oxide, olefin oxides, ($C_{12-14}H_{22-26}O_3$) glycidyl esters of tert-carboxylic acid, p-tert-butyl phenyl glycidyl ether, aliphatic mono-glycidyl ethers containing alkyl chains which are predominantly n-octyl and n-decyl, mixtures thereof, and the like.

As previously noted, accelerators can be incorporated in the composition. The accelerator used is preferably one having a low water sensitivity, although water-sensitive accelerators can also be used so long as the amount added does not adversely affect the operability of the total composition. Examples of such suitable accelerators are bisphenol A, Methylon Resin GE 75108 (a resin that is a mixture of the allyl ethers of mono-, di-, and tri-methylol phenols), aliphatic amines, tertiary amines such as dimethylaminoethylphenol (DMP–10) and tri-(dimethylaminomethyl)phenol (DMP–30) and polyamide resins copolymerizable with epoxy resins.

The method of making the curing agents is by admixing the polyamine with the monofunctional epoxide-containing material and allowing the mixture to exotherm. The order of admixing the reactants is not critical, but in situations where an aliphatic mono-epoxide compound and an aromatic monoepoxide compound are to be used in making a curing agent, it is preferred to first react the aliphatic compound with the polyamine since they are less reactive than the aromatic compounds. This insures full reaction. If desired, any fillers to be used in the final coating composition can also be added to the curing agent reaction mixture. Certain accelerators, such as bisphenol A, can also be added to the reactants with no harmful results.

As to proportions, the amount of monofunctional epoxide-containing material admixed with the polyamine is that required to render the resultant reaction product relatively water-insensitive, preferably to a water solubility of less than about 5 percent. This amount will vary dependent upon the particular reactants used, but for most cases two moles of a monofunctional epoxide-material are required for each mole of polyamine in order to render the resultant reaction product sufficiently water insensitive. An exception to this general observation is when DETA is reacted with Cardura-E (a glycidyl ester produced by the reaction of Versatic 911 acid and epichlorohydrin. Versatic 911 acid is a mixture of highly branched, mainly tertiary monocarboxylic acids having $C_9$, $C_{10}$, $C_{11}$ chain lengths). In this case one mole of each sufficed to insure suitable water insensitivity of the resultant reaction product. Thus, the particular ratio of each group of reactants for a particular curing agent can be readily determined by testing the solubility of the resultant reaction product and varying the ratios until the required degree of water insolubility is attained. In addition, the quantity of reactants do not necessarily have to be mole:mole in ratio. In this reaction small quantities of free amine may be present in the curing agent. The curing agent can be used with such amine present or with the free amine removed.

The compositions of the present invention are formed by admixing the curing agent with the epoxy resin just prior to use. The amount of each component will vary widely depending upon the end use of the composition and the specific materials used in making the curing agent and the particular epoxy resin. The amounts to be used are readily determinable by those skilled in the art by simply mixing the two components in varying ratios utilizing the present knowledge with respect to curing epoxy resins and finding those ratios which are most suitable for the particular application desired. In usual practice from about 40 to about 100 parts by weight of the curing agent are used for each 100 parts by weight of resin. When an accelerator is utilized, it is present in amount of about 5 to 15, and preferably about 10 parts by weight for each 100 parts of curing agent.

In addition to the essential components of the composition and the accelerator the usual fillers, pigments, solvents, lubricants, corrosion inhibitors, and the like compounds used in coating compositions can be included in the compositions of the present invention in their usual proportions and for their usual effect. If desired, resins that co-react with the epoxy resin can also be included. It should be understood that of the foregoing materials only those that are water insensitive should be used in any major amounts to avoid release of any such material when the composition is applied under water to be cured under water.

The invention will be further described in connection with the following examples of the practice of it which are set forth for the purpose of illustration only and wherein proportions are in parts by weight unless specifically stated to the contrary.

EXAMPLE 1

Formulation

| Component B: | Parts by weight |
|---|---|
| Adduct¹ of triethylene tetramine with Epi-Rez 5012 and Epi-Rez 5011 | 603 |
| Duomeen L-11 (fatty acid amine corrosion inhibitor) | 67 |
| Lead silico-chromate filler | 300 |
| Asbestine 425 filler (magnesium silicate) | 300 |
| Methylon Resin GE-75108 | 100 |
| Component A: | |
| Epon 828 (epoxy resin) | 950 |
| Araldite RD-2 (reactive diluent) | 50 |
| Plastics Red #2051 (pigment) | 10 |

¹ This adduct is made in the following manner:

| | Mole |
|---|---|
| Triethylene tetramine | 1 |
| Epi-Rez 5012 | 1 |
| Epi-Rez 5011 | 1 |

The TETA was first reacted with the Epi-Rez 5012 (aliphatic mono-glycidyl ether containing alkyl chains which are predominantly n-octyl and n-decyl). When the exotherm was over, then the Epi-Rez 5011 (cresyl glycidyl ether) was added and allowed to exotherm.

Components A and B were admixed just prior to use and the resulting composition applied to an underwater surface. The composition cured under water to form a hard, uniform coating. It can also be applied to freshly hardened concrete (about one day after pouring).

The composition is applied with an ordinary paint brush or roller and is immediately resistant to vertical displacement action of waves at the critical tide line area. Where field conditions necessitate, the composition in its container may be submerged under water. It can be applied at water temperatures as low as about 50° F. and in water with a pH of about 3.5 to about 12.

EXAMPLE 2

Formulation

| Component B: | Parts by weight |
|---|---|
| Adduct¹ of triethylene tetramine with Epi-Rez 5012 and Epi-Rez 5011 | 705 |
| Methylon Resin GE-75108 | 100 |
| Component A: | |
| Epon 828 | 1,000 |
| Pigment | 80 |
| Panasol AN-3 (aromatic hydrocarbon solvent) | 150 |
| Hercoflat-1200 (polypropylene texturing pigment) | 100 |
| Dry shake sand | 2,500 |
| Dow Corning 200 fluid (synthetic silicone lubricant) | 10 |

¹ This adduct is made in the following manner:

| | Mole |
|---|---|
| Triethylene tetramine | 1 |
| Epi-Rez 5012 | 1 |
| Epi-Rez 5011 | 1 |

The TETA was first reacted with the Epi-Rez 5012. When the exotherm was over, then the Epi-Rez 5011 was added and allowed to exotherm.

This formulation is suitable as a flooring material. It is sand-filled and applied with a trowel to a wet or dry surface. It cures to a hard, uniform coating.

EXAMPLE 3

Formulation

| Component B: | Parts by weight |
|---|---|
| Adduct¹ of triethylene tetramine with Cardura-E and Epi-Rez 5011 | 800 |
| Bisphenol-A | 80 |
| Silica Flour 219 (filler) | 1,000 |
| Component A: | |
| Epon 828 | 1,000 |
| Cab-O-Sil M-5 (colloidal silica) | 100 |
| Silica Flour 219 | 400 |
| Panasol AN-3 | 220 |

¹ This adduct was made in the following manner:

| | Mole |
|---|---|
| Triethylene tetramine | 1 |
| Cardura-E | 1 |
| Epi-Rez 5011 | 1 |

The TETA was first reacted with the Cardura-E (glycidyl ether of Versatic 911 acid). When the exotherm was over, then the Epi-Rez 5011 was added and allowed to exotherm.

Components A and B when mixed together form a thixotropic coating material that is adhesive in nature. It can be applied as is or with sand to patch cracks and potholes which are under water.

EXAMPLE 4

Formulation

| Component B: | Parts by weight |
|---|---|
| Adduct¹ of triethylene tetramine with Epi-Rez 5012 and Epi-Rez 5011 | 900 |
| Methylon Resin GE-75108 | 90 |
| Component A: | |
| Epon 838 | 950 |
| Araldite RD-2 (Reactive diluent) | 50 |
| Paraplex WP-1 (Synthetic unsaturated polyester resin) | 100 |

¹ This adduct was made in the following manner:

| | Mole |
|---|---|
| Triethylene tetramine | 1 |
| Epi-Rez 5012 | 1 |
| Epi-Rez 5011 | 1 |

The TETA was first reacted with the Epi-Rez 5012. When the exotherm was over, then the Epi-Rez 5011 was added and allowed to exotherm.

This composition is clear and can be used as a primer coating.

EXAMPLE 5

Formulation

| Component B: | Parts by weight |
|---|---|
| Adduct [1] of diethylene triamine with Cardura-E | 3,000 |
| Silica Flour 219 | 4,200 |
| Pine oil | 828 |
| Bisphenol-A | 360 |
| Titanox-RA-50 (rutile titanium dioxide) | 120 |
| Mineral filler | 600 |
| Component A: | |
| Epon 828 | 6,000 |
| Pine oil | 794 |
| Cab-O-Sil M-5 | 600 |

[1] This adduct was made in the following manner:

| | Mole |
|---|---|
| Cardura-E | 1 |
| Diethylene triamine | 1 |

The DETA was mixed with the Cardura-E and allowed to exotherm.

The coating composition formed when the two components are admixed is thixotropic and adhesive in nature. It is used with or without sand to patch or coat underwater cracks and pot-holes.

EXAMPLE 6

Formulation

| Component B: | Parts by weight |
|---|---|
| Adduct [1] of diethylene triamine with Cardura-E | 500 |
| Panasol AN-3 (aromatic hydrocarbon solvent) | 355 |
| Component A: | |
| Epon 828 | 1,000 |

[1] This adduct was made in the following manner:

| | Mole |
|---|---|
| Cardura-E | 1 |
| Diethylene triamine | 1 |

The DETA was mixed with the Cardura-E and allowed to exotherm.

This composition is formulated for low viscosity and has a long pot life. It is suitable for coating underwater surfaces.

EXAMPLE 7

Formulation

| Component B: | Parts by weight |
|---|---|
| Adduct [1] of diethylene triamine with Cardura-E | 100.0 |
| CP-524 Coal Tar | 211.2 |
| Methylon Resin GE-75108 | 10.0 |
| Component A: | |
| Epon 828 | 192.0 |
| Pine oil | 38.4 |
| Asbestine 425 | 100.0 |

[1] This adduct was made in the following manner:

| | Mole |
|---|---|
| Cardura-E | 1 |
| Diethylene triamine | 1 |

The DETA was mixed with the Cardura-E and allowed to exotherm.

Components A and B when admixed prior to use form a coal tar extended composition which when applied to steel or concrete under water cures to form a continuous protective coating.

EXAMPLE 8

The formulation of Example 1 is used except that there is substituted for Epon 828, separately and in turn, each of the following commercial epoxy resins presently utilized in coatings: Epi-Rez 510, 509, 504, 5071, 5077, 515B, 520C and 522C; Epon 820, 834, 864 and 1001; Araldite 502, 504, 6005 and 6010; and ERL 2795, 3794, 2774 and 2003.

In each case a suitable underwater coating composition is obtained.

EXAMPLE 9

The following series of curing agents were made and can be used in the compositions set forth in Examples 1-8 to cure the epoxy resin:

| Curing agent: | Approx. mole ratio |
|---|---|
| (a) | |
| DETA | 1 |
| Epi-Rez 5011 | 2 |
| (b) | |
| DETA | 1 |
| Epi-Rez 5011 | 1 |
| Epoxide #7 (same chemical designation as Epi-Rez 5012) | 1 |
| (c) | |
| TETA | 1 |
| Epi-Rez 5012 | 2 |
| (d) | |
| TETA | 1 |
| Epi-Rez 5012 | 1 |
| Epi-Rez 5011 | 1 |
| (e) | |
| PEHA | 1 |
| Epi-Rez 5012 | 2 |
| (f) | |
| PEHA | 1 |
| Epi-Rez 5012 | 1 |
| Epi-Rez 5011 | 1 |
| (g) | |
| TETA | 1 |
| Araldite RD-1 | 1 |
| Epi-Rez 5011 | 1 |
| (h) | |
| 1,3-propane diamine | 1 |
| Epi-Rez 5012 | 1 |
| (i) | |
| 1,3-propane diamine | 1 |
| Araldite RD-1 | 1 |
| Epi-Rez 5011 | 1 |
| (j) | |
| Imino-bis-propylamine | 1 |
| Epi-Rez 5012 | 1 |
| (k) | |
| Imino-bis-propylamine | 1 |
| Epi-Rez 5012 | 1 |
| Epi-Rez 5011 | 1 |
| (l) | |
| Cardura-E | 1 |
| TETA | 1 |
| (m) | |
| Cardura-E | 1 |
| DETA | 1 |
| (n) | |
| Cardura-E | 1 |
| EDA | 1 |
| (o) | |
| Cardura-E | 1 |
| TETA | 1 |
| Epi-Rez 5011 | 1 |

In each case the curing agent was formed by admixing the reactants and allowing them to exotherm. In compositions where a combination of aliphatic and aromatic mono-epoxide compounds was used, some reactions were carried out simply by admixing both compounds at the same time with the polyamine and others were carried out by first reacting the aliphatic mono-epoxide compound with the polyamine followed by reaction with the aromatic compound.

Olefin oxides, styrene, glycidyl methacrylate, and the like monoepoxide materials previously noted can be used in place of the glycidyl esters and ethers specifically set forth above.

It will be evident from the foregoing that the term "coating compositions" as used herein refers to compositions that are suitable as paints, adhesives, flooring materials and the like surface covering materials. They have the ability to uniformly cover and adhere to wet surfaces and to cure under such conditions.

It will be understood that it is intended to cover all changes and modifications of the examples of the invention herein chosen for the purpose of illustration which do not constitute departures from the spirit and scope of the invention.

What is claimed is:

1. A coating composition comprising an epoxy resin having a plurality of 1,2-epoxy groups and a substantially water-insensitive curing agent for said resin comprising a reaction product of 1 mol of an aliphatic polyamine and 2 mols of a monofunctional epoxide-containing compound having a 1,2-epoxy group which is reactive with an amine.

2. The composition of claim 1 wherein the monofunctional epoxide-containing compound is a combination of an aliphatic and aromatic monofunctional epoxide-containing material.

3. The composition of claim 1 wherein the curing agent has a water solubility of not more than about 5 percent.

4. The composition of claim 1 wherein the curing agent is present in an amount of from about 40 to about 100 parts by weight for each 100 parts by weight of resin.

5. The composition of claim 1 including an accelerator of curing selected from the group consisting of bisphenol A, a resinous mixture of the allyl ethers of mono-, di-, and tri-methylol phenols, aliphatic amines, tertiary amines, and polyamide resins copolymerizable with epoxy resins.

6. A coating composition comprising an epoxy resin having a plurality of 1,2-epoxy groups that is a condensation product of bisphenol A and epichlorhydrin and a substantially water-insensitive curing agent for said resin consisting essentially of the reaction product of triethylene tetramine and a combination of an aliphatic monoglycidyl ether and an aromatic glycidyl ether, there being substantially equal molar amounts of each of the reactants of the curing agent.

7. The composition of claim 6 including a water-insensitive accelerator of curing selected from the group consisting of bisphenol A, a resinous mixture of the allyl ethers of mono-, di-, and tri-methylol phenols, aliphatic amines, tertiary amines, and polyamide resins copolymerizable with epoxy resins.

8. The composition of claim 7 wherein the solubility of the curing agent is not more than about 5 percent, there is present, for each 100 parts by weight of epoxy resin, from about 40 to about 100 parts by weight of the curing agent, and the amount of accelerator is from about 5 to about 15 parts by weight, for each 100 parts by weight of curing agent.

9. The composition of claim 8 wherein the aliphatic glycidyl ether is one containing alkyl chains which are predominantly n-octyl and n-decyl and the aromatic glycidyl ether is cresyl glycidyl ether.

References Cited

UNITED STATES PATENTS

| | | | |
|---|---|---|---|
| 2,864,775 | 12/1958 | Newey | 260—47 Ep X |
| 2,938,004 | 5/1960 | De Hoff et al. | 260—47 Ep X |

OTHER REFERENCES

Handbook of Epoxy Resins, Lee et al., July 1967 (pp. 13-10).

WILLIAM H. SHORT, Primary Examiner

T. L. PERTILLA, Assistant Examiner

U.S. Cl. X.R.

117—161 ZB; 260—2 N, 28, 29.1 R, 37 Ep, 59, 830